US008125197B2

(12) United States Patent
Hwang et al.

(10) Patent No.: US 8,125,197 B2
(45) Date of Patent: Feb. 28, 2012

(54) SWITCH CONTROLLER, SWITCH CONTROL METHOD, AND CONVERTER USING THE SAME

(75) Inventors: Jong-Tae Hwang, Seoul (KR); Moon-Sang Jung, Seoul (KR); Jin-Sung Kim, Seoul (KR); Dae-Ho Kim, Gyonggi-do (KR); Min-Ho Jung, Gyonggi-do (KR)

(73) Assignee: Fairchild Korea Semiconductor Ltd., Bucheon, Kyungki-do (KR)

( * ) Notice: Subject to any disclaimer, the term of this patent is extended or adjusted under 35 U.S.C. 154(b) by 153 days.

(21) Appl. No.: 12/509,013

(22) Filed: Jul. 24, 2009

(65) Prior Publication Data

US 2010/0019809 A1 Jan. 28, 2010

(30) Foreign Application Priority Data

Jul. 25, 2008 (KR) .................. 10-2008-0073217

(51) Int. Cl.
*G05F 1/70* (2006.01)
(52) U.S. Cl. .................................. 323/207; 363/89
(58) Field of Classification Search .................. 323/207; 363/86, 89
See application file for complete search history.

(56) References Cited

U.S. PATENT DOCUMENTS

| | | | | |
|---|---|---|---|---|
| 5,818,707 A | * | 10/1998 | Seong et al. | 363/89 |
| 7,149,097 B1 | * | 12/2006 | Shteynberg et al. | 363/16 |
| 7,259,525 B2 | | 8/2007 | Yang | |
| 7,391,630 B2 | * | 6/2008 | Acatrinei | 363/89 |
| 2007/0097044 A1 | | 5/2007 | Yang | |
| 2008/0018261 A1 | | 1/2008 | Kastner | |
| 2010/0165683 A1 | * | 7/2010 | Sugawara | 363/126 |
| 2010/0246226 A1 | * | 9/2010 | Ku et al. | 363/126 |

OTHER PUBLICATIONS

Supertext Inc., *3-Pin Switch-Mode LED Lamp Driver IC*, HV9922, pp. 1-10, Copyright 2008.

* cited by examiner

*Primary Examiner* — Shawn Riley
(74) *Attorney, Agent, or Firm* — Alston & Bird LLP

(57) ABSTRACT

Disclosed are a switch controller, a switch control method, and a converter based thereon. The switch controller generates an input sensing voltage corresponding to the input voltage of the converter, and compares the input sensing voltage with a predetermined first reference value. The switch controller generates a zero cross detection signal with a first level or a second level depending upon the comparison result, and generates a reference clock signal varying in frequency in accordance with one cycle of the zero cross detection signal. The switch controller generates digital signals by using the reference clock signal and the zero cross detection signal. The digital signals synchronize with the zero cross detection signal, and increase in accordance with the reference clock signal during a half of one cycle of the zero cross detection signal, while decreasing in accordance with the reference clock signal during the other half cycle of the zero cross detection signal. The switch controller generates a reference signal with a voltage level corresponding to the digital signal.

20 Claims, 4 Drawing Sheets

SWITCH CONTROLLER, SWITCH CONTROL METHOD, AND CONVERTER USING THE SAME

CROSS-REFERENCE TO RELATED APPLICATION

This application claims priority to and the benefit of Korean Patent Application No. 10-2008-0073217 filed in the Korean Intellectual Property Office on Jul. 25, 2008, the entire contents of which are incorporated herein by reference.

BACKGROUND OF THE INVENTION (a) Field of the Invention

The present invention relates to a switch controller, a switch control method, and a converter using the same, and more particularly, to a power factor correction switch controller, a power factor correction switch control method, and a converter using the same.

(b) Description of the Related Art

A converter receives power and supplies the power to the target load. The input power is alternating current (AC) voltage, and the output power supplied to the load is direct current (DC) voltage. As the current flowing along the load is similar to the input power current, a phase difference occurs between the input power voltage and the input power current, and causes power loss. In case the load connected to the output terminal of the converter is an LED light source including a plurality of LEDs and a DC current flows to the respective LEDs, a power loss occurs due to the phase difference between the input power voltage and the input power current so that the power factor is lowered.

In order to improve the power factor, the phase difference between the input power voltage and the input power current should be reduced. The input power current is influenced by the current flowing along the load. For this reason, when the current supplied to the load involves a frequency and a phase similar to those of the input power voltage, the phase difference between the input power current and the input power voltage can be reduced.

Furthermore, it is necessary in improving the total harmonic distortion (THD) to make the input power current bear a sine curve. The power switch of the converter may interfere with other equipment due to the switching operation thereof. In order to minimize such interference, the harmonic component of the input power current should be small. The THD is to digitize the amount of harmonics, and it is required in reducing the THD to approximate it to the single frequency sine curve. That is, in order to improve the power factor and the THD, the current supplied to the load should be in the form of a sine curve, and should have a frequency and a phase similar to those of the input power voltage.

With the conventional converter, the input AC power is full-wave rectified so as to generate an input voltage, and the input voltage is sensed so as to generate a reference signal. The reference signal and the current flowing along the load are compared with each other, and the current flowing along the load is controlled in dimension in accordance with the reference signal. As the reference signal is altered depending upon the input voltage, the current flowing along the load is also altered in dimension depending upon the reference signal. Accordingly, the current supplied to the load involves a frequency and a phase that are approximated to those of the input power voltage. Furthermore, the input power current has a similar form to the sine curve. However, in case a resistor is used to sense the full-wave rectified input power voltage, it is difficult to integrate a control unit for controlling the converter. The reason is that the input power voltage is commonly high, and it is difficult to integrate the high voltage-endurable resistor. Furthermore, power consumption separately occurs at the resistor.

A separate power factor correction controller circuit may be used to correct the power factor in a different manner. However, in this case, an additional element is needed to serve the power factor correction controller circuit so that the production cost increases, and it becomes difficult to realize the required integration.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a switch controller, a switch control method, and a converter based thereon having advantages of improving the power factor and the THD of the converter with a simplified structure.

An exemplary embodiment of the present invention provides a switch controller including a voltage sensor generating an input sensing voltage corresponding to the voltage input into the switch. A zero voltage detector compares the input sensing voltage with a predetermined first reference value, and generates a zero cross detection signal with a first level or a second level in accordance with the comparison result. A reference clock generator generates a reference clock signal such that the reference clock signal varies in frequency by one cycle of the zero cross detection signal. A digital sine curve generator generates digital signals by using the reference clock signal and the zero cross detection signal. The digital signals synchronize with the zero cross detection signal, and increase in accordance with the reference clock signal during half of one cycle of the zero cross detection signal, while decreasing in accordance with the reference clock signal during the other half cycle of the zero cross detection signal. A digital-to-analog converter generates a reference signal with a voltage level corresponding to the digital signal. The voltage sensor includes a sensing current generator generating a current corresponding to the voltage of the first electrode, and a current-voltage transformer generating a voltage corresponding to the current. The zero voltage detector generates a zero cross detection signal with a first level when the input sensing voltage exceeds the first reference value, and a zero cross detection signal with a second level when the input sensing voltage is less than the first reference value. The reference clock generator senses a reference point when the zero cross detection signal varies from the first level to the second level so as to produce one cycle of the zero cross detection signal by using the two successive reference time points, and generates a reference clock signal rising and falling by a predetermined number of times during the produced one cycle. It is also possible that an arbitrary time point is sensed as a reference time point during the time period ranged from the point when the zero cross detection signal varies from the first level to the second level to the point when the zero cross detection signal varies from the second level to the first level so as to produce one cycle of the zero cross detection signal by using the two successive reference time points, and a reference clock signal rising and falling a predetermined number of times during the produced one cycle is generated. In case the zero cross detection signal is in an abnormal state where the zero cross detection signal is not specified in a cycle, the effective value of the maximum reference signal value in the normal state of the zero cross detection signal is determined as the reference signal.

Another exemplary embodiment of the present invention provides a converter including an inductor, a power switch controlling the current flowing along the inductor, and a switch controller controlling the switching operation of the power switch. The switch controller generates a reference signal corresponding to the input voltage supplied into the inductor, and controls the duty of the power switch by using the current flowing along the power switch and the reference signal. The input voltage is supplied to a first end of the inductor and the power switch is electrically connected to a second end of the inductor. A diode is connected between the second end of the inductor and the power switch. The current flows along a route including the inductor and the power switch when the power switch turns on, while the current flows along a route including the inductor and the diode when the power switch turns off. The switch controller includes a voltage sensor generating an input sensing voltage corresponding to the switch voltage when the switch turns off and a switch voltage corresponding to the input voltage is supplied to an end of the power switch. A zero voltage detector compares the input sensing voltage with a predetermined first reference value and generates a zero cross detection signal with a first level or a second level depending upon the comparison result. A reference clock generator generates a reference clock signal varying in frequency by one cycle of the zero cross detection signal. A digital sine curve generator generates digital signals by using the reference clock signal and the zero cross detection signal. The digital signals synchronize with the zero cross detection signal, and increase in accordance with the reference clock signal during half of one cycle of the zero cross detection signal, while decreasing in accordance with the reference clock signal during the other half cycle of the zero cross detection signal. A digital-to-analog transformer generates the reference signal with a voltage level corresponding to the digital signal. The zero voltage detector generates a zero cross detection signal with a first level when the input sensing voltage exceeds the first reference value during the turned-off period of the switch, and generates a zero cross detection signal with a second level when the input sensing voltage is less than the first reference value. The reference clock generator senses a reference point when the zero cross detection signal varies from the first level to the second level so as to produce one cycle of the zero cross detection signal by using the two successive reference time points, and generates a reference clock signal rising and falling a predetermined number of times during the produced one cycle. The reference clock generator may sense an arbitrary time point as a reference time point during the period ranged from the point when the zero cross detection signal varies from the first level to the second level to the time point when the zero cross detection signal varies from the second level to the first level so as to produce one cycle of the zero cross detection signal by using the two successive reference time points, and generate a reference clock signal rising and falling a predetermined number of times during the produced one cycle. The converter further includes an oscillator generating a clock signal with a predetermined cycle. The power switch turns off when the current flowing along the power switch reaches the reference signal, and turns on by one cycle of the clock signal. In case the zero cross detection signal is in the abnormal state where the zero cross detection signal is not specified in a cycle, the effective value of the maximum reference signal value in the normal state of the zero cross detection signal is determined as the reference signal.

Yet another exemplary embodiment of the present invention provides a method of controlling the switching operation of a switch. In the method, an input sensing voltage corresponding to the voltage input into the switch is first generated. The input sensing voltage is compared with a predetermined first reference value and generates a zero cross detection signal with a first level or a second level depending upon the comparison result. A reference clock signal varying in frequency by one cycle of the zero cross detection signal is then generated. Digital signals are generated by using the reference clock signal and the zero cross detection signal. The digital signals synchronize with the zero cross detection signal, and increase in accordance with the reference clock signal during half of one cycle of the zero cross detection signal, while decreasing in accordance with the reference clock signal during the other half cycle of the zero cross detection signal. A reference signal with a voltage level corresponding to the digital signal is generated. When the current flowing along the switch reaches the reference signal, the switch turns off. With the generation of the zero cross detection signal, a zero cross detection signal with a first level is generated when the input sensing voltage exceeds the first reference value, and a zero cross detection signal with a second level is generated when the input sensing voltage is less than the first reference value. With the generation of the reference clock signal, the reference point when the zero cross detection signal varies from the first level to the second level is sensed so as to produce one cycle of the zero cross detection signal by using the two successive reference time points, and a reference clock signal is generated such that the reference clock signal rises and falls a predetermined reference number of times during the produced one cycle. It is also possible with the generation of the reference clock signal that an arbitrary time point is sensed as the reference time point during the period ranging from the point when the zero cross detection signal varied from the first level to the second level to the point when the zero cross detection signal varies from the second level to the first level so as to produce one cycle of the zero cross detection signal by using the two successive reference time points, and a reference clock signal is generated such that the reference clock signal rises and falls a predetermined reference number of times during the produced one cycle. In case the zero cross detection signal is in the abnormal state where the cycle thereof is not specified, the effective value of the maximum reference signal value in the normal voltage of the reference signal is determined as the reference signal.

With an exemplary embodiment of the present invention, the duty of the power switch is determined by using a reference signal with a frequency and a phase similar to those of the input voltage.

Furthermore, with another exemplary embodiment of the present invention, the effective value of the reference signal in the normal state thereof is used as a reference signal in the abnormal state thereof.

With the structural features, the desired power factor correction can be made without any separate power factor correction circuit or power consumption.

DETAILED DESCRIPTION OF THE EMBODIMENTS

Figure 1:
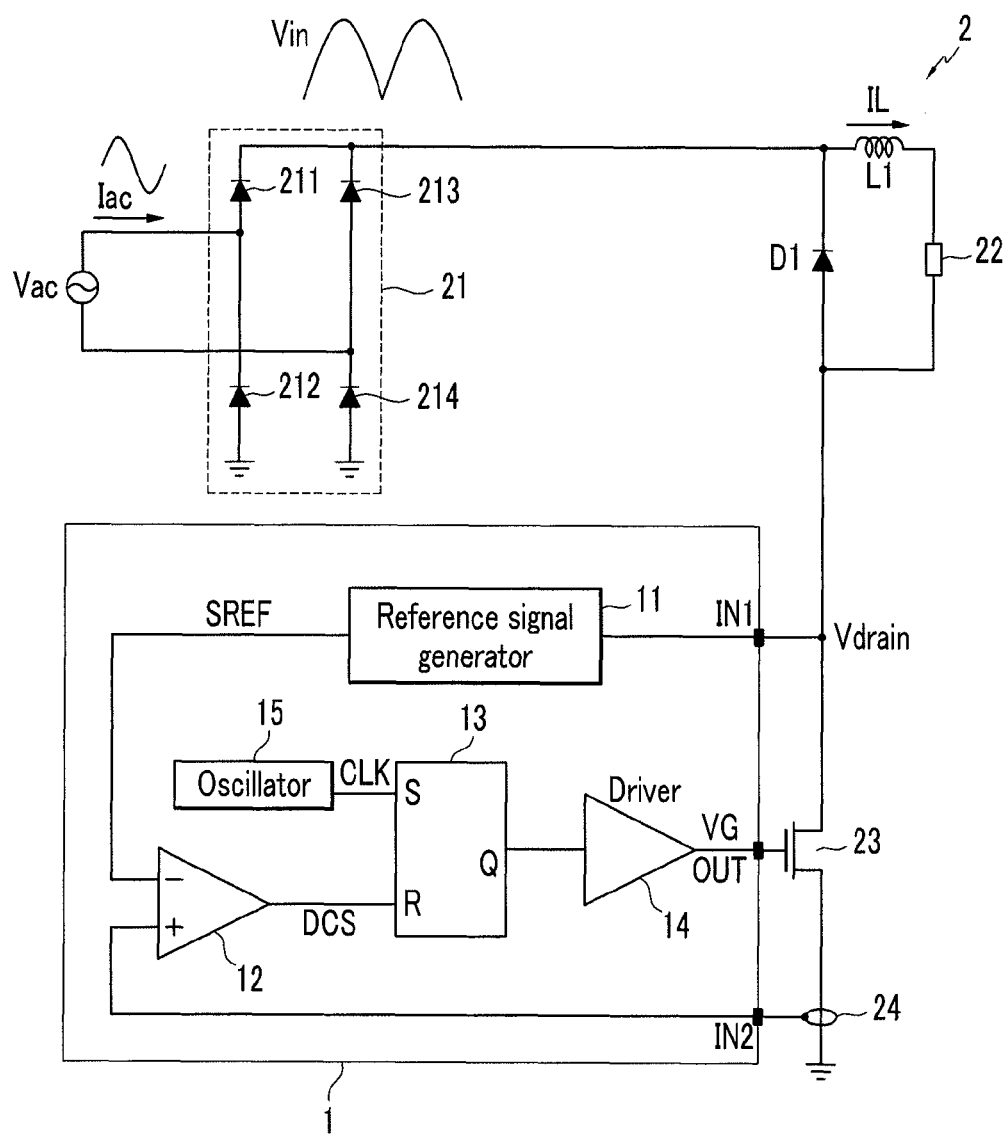
FIG. 1 is a diagram of a converter with a switch controller according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "electrically connected" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a diagram of a converter 2 with a switch controller 1 according to an exemplary embodiment of the present invention.

As shown in FIG. 1, the converter 2 includes a power switch 23, a bridge diode 21, a diode D1, an inductor L1, and a current sensor 24. The power switch 23 according to an exemplary embodiment of the present invention is formed with an n-channel metal oxide semiconductor field effect transistor (NMOSFET), which turns on or off in accordance with a gate control signal VG of the switch controller 1. With an exemplary embodiment of the present invention, current driving elements such as light emitting diodes (LED) may be connected to the power switch 23 as a load 22.

The bridge diode 21 is formed with four diodes 211 to 214, and full-wave rectifies the input alternating current so as to generate an input voltage Vin.

The output terminal of the bridge diode 21 is connected to a cathode electrode of the diode D1 and an end of the inductor L1. The input voltage Vin is supplied to one end of the inductor L1, and the other end of the inductor L1 is connected to the load.

The drain electrode of the power switch 23 is connected to an anode electrode of the diode D1 and the load.

The current sensor 24 is connected to a source electrode of the power switch 23, and senses the current flowing along the power switch 23 so as to generate a signal corresponding to the sensed current.

When the power switch 23 turns on, a current IL flows through the inductor L1, the load 22, and the power switch 23. When the current flowing along the power switch 23 reaches a predetermined reference value, the power switch 23 turns off, and the diode D1 is turned on by way of the inductor current IL. Then, the current IL flows through the inductor L1, the load 22, and the diode D1. When the power switch 23 turns off, the inductor current IL freewheels. The D1 diode is a freewheeling diode, which forms the freewheeling route, and the inductor current IL is supplied to the load 22 in accordance with the switching operation of the power switch 23, or freewheeling.

The switch controller 1 for controlling the switching operation of the power switch 23 will now be described in detail.

The switch controller 1 according to an exemplary embodiment of the present invention senses the voltage of the drain electrode of the power switch 23 (referred to hereinafter as the drain voltage Vdrain), and generates a reference signal SREF having a frequency and a phase similar to those of the input voltage Vin by using the drain voltage Vdrain. The diode D1 is turned on by way of the inductor current IL when the power switch 23 turns off. Then, the drain voltage Vdrain of the power switch 23 approximates the input voltage Vin very closely. When the power switch 23 turns off so that the diode D1 is turned on, the switch controller 1 senses the drain voltage Vdrain so as to detect the time point when the input voltage Vin approximates '0.'

In case the time point when the input voltage Vin approximates '0' is detected, the reference signal SREF synchronized with the input voltage Vin can be generated. As the input voltage Vin is full-wave rectified by way of the bridge diode 21, it has a waveform where the sine curve is full-wave rectified. The waveform generated by full-wave rectifying the input voltage Vin will now be called the full-wave rectified sine curve. When the switch controller 1 switches the power switch 23 by using the reference signal SREF synchronized with the full-wave rectified input voltage Vin, the inductor current IL supplied to the load through the inductor L1 is a full-wave rectified sine curve in accordance with the reference signal SREF. Accordingly, the inductor current IL can have a frequency and a phase similar to those of the input voltage Vin. Specifically, the switch controller 1 controls the current flowing along the power switch 23 by using the reference signal SREF. During the one-cycle switching operation of the power switch 23, the peak value of the current flowing along the power switch 23 is controlled in accordance with the reference signal SREF. The peak value of the current flowing along the power switch 23 during one cycle of the input voltage Vin varies in accordance with the full-wave rectified sine curve.

As the current of the power switch 23 is the same as the inductor current IL during the turned-on time of the power switch 23, the peak value of the inductor current IL varies in accordance with the full-wave rectified sine curve. The current Iac of the input power is an average current of the inductor current IL. So, in case the peak value of the inductor current IL varies in accordance with the full-wave rectified sine curve, the current Iac of the input power varies in accordance with the full-wave rectified sine curve. Therefore, the input power voltage Vac and the input power current Iac also have a frequency and a phase similar to each other. Accordingly, the power factor of the converter is corrected.

The switch controller 1 includes three connection terminals including input terminals IN1 and IN2 and an output terminal OUT. The input terminal IN1 is connected to the drain electrode of the power switch 23. The input terminal IN2 is connected to the current sensor 24 so as to receive a sensing signal Vsense. With an exemplary embodiment of the present invention, the sensing signal Vsense may be a voltage signal. The output terminal OUT is connected to the gate electrode of the power switch 23, and a gate control signal VG is output through the output terminal OUT. The switch controller 1 receives the drain voltage Vdrain of the power switch 23 through the input terminal IN1 so as to estimate the waveform of the input voltage Vin, and generates a reference signal SREF, which is formed with a full-wave rectified sine curve having a frequency and phase similar to those of the input voltage Vin.

The switch controller 1 includes a reference signal generator 11, a comparator 12, a logical operation unit 13, and a gate driver 14.

The reference signal generator 11 generates a reference signal SREF with a frequency and a phase similar to those of the input voltage Vin by using the drain voltage Vdrain input through the input terminal IN1. The reference signal generator 11 will be specifically described later with reference to FIG. 2.

The comparator 12 receives the reference signal SREF and the sensing signal Vsense at inverting and non-inverting terminals (−) and (+) thereof, and compares the two signals with each other so as to generate a duty control signal DCS depending upon the comparison result. When the sensing signal Vsense reaches the reference signal SREF, the comparator 12 generates a high-level duty control signal DCS. In case the sensing signal Vsense is lower than the reference signal SREF, the comparator 12 generates a low-level duty control signal DCS.

An oscillator 15 generates a clock signal CLK with a predetermined cycle, and outputs it to the logical operation unit. The cycle of the clock signal CLK determines the switching cycle of the power switch 23.

The logical operation unit 13 includes first and second input terminals, and an output terminal. The logical operation unit 13 receives a clock signal through the first input terminal, and a duty control signal DCS through the second input terminal. In synchronization with the point when the clock signal CLK rises, the logical operation unit 13 outputs a gate driver control signal GC through the output terminal to turn on the power switch 23. In synchronization with the point when the duty control signal DCS rises, the logical operation unit 13 outputs a gate driver control signal GC through the output terminal to turn off the power switch 23. The turned-off power switch 23 again turns on at the point when the clock signal CLK rises. The cycle of the clock signal CLK determines the switching cycle of the power switch 23, and the duty control signal DCS determines the turned-on period of the power switch 23, that is, the duty thereof.

The gate driver 14 generates a gate signal VG to turn the power switch 23 on or off in accordance with the gate driver control signal GC. As the power switch 23 according to an exemplary embodiment of the present invention is an NMOS-FET, the gate control signal VG for turning on the power switch 23 is in the high level, and the gate control signal VG for turning off the power switch 23 is in the low level.

The reference signal generator 11 according to an exemplary embodiment of the present invention will now be described with reference to FIG. 2.

Figure 2:
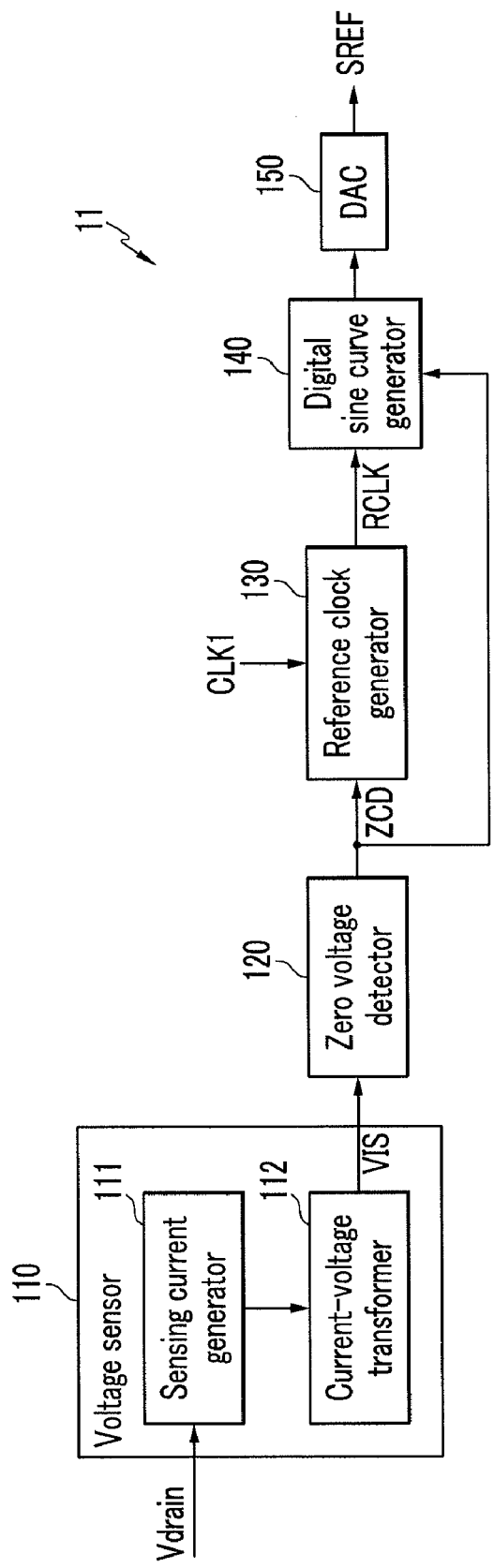
FIG. 2 is a block diagram of a reference signal generator according to an exemplary embodiment of the present invention.

FIG. 2 illustrates the reference signal generator 11 according to an exemplary embodiment of the present invention.

As shown in FIG. 2, the reference signal generator 11 includes a voltage sensor 110, a zero voltage detector 120, a reference clock generator 130, a digital sine curve generator 140, and a digital-to-analog converter 150.

When the power switch 23 turns off, the voltage sensor 110 senses the drain voltage Vdrain of the power switch 23, and generates an input sensing voltage VIS corresponding to the input voltage Vin. The voltage sensor 110 includes a sensing current generator 111, and a current-voltage transformer 112. The sensing current generator 111 generates a current signal corresponding to the drain voltage Vdrain. Specifically, the sensing current generator 111 generates a current corresponding to the drain voltage Vdrain by using a transistor, such as a bipolar junction transistor (BJT) and a field effect transistor (FET). With the use of the BJT, the voltages between the base and the emitter are fixed to the extent that the BJT is turned on, and the drain voltage Vdrain of the power switch 23 is applied to the collector. Furthermore, with the use of the FET, the voltages between the gate and the source are fixed to the extent that the FET is turned on, and the drain voltage Vdrain of the power switch 23 is applied to the drain. Then, the current flowing along the BJT or the FET is determined depending upon the voltage applied to the collector or the drain. In case the collector or the drain voltage of the power switch 23 is high, the current of the BJT or the FET is operated in the saturated region, and a predetermined high current flows along the BJT or the FET. When the collector or the drain voltage is lowered, the BJT or the FET is operated in the linear region, and a current proportional to the collector or the drain voltage flows along the BJT or the FET. When the power switch 23 turns on, the drain voltage Vdrain of the power switch 23 is substantially the same as the ground voltage. Then, no current flows along the BJT or the FET. Accordingly, when the power switch 23 turns off, a current flows along the BJT or the FET in accordance with the input voltage Vin. By contrast, when the switch 23 turns on, no current flows along the BJT or the FET. The current-voltage transformer 112 generates a voltage signal corresponding to the current received from the sensing current generator 111, and transmits it to the zero voltage detector 120. Accordingly, when the power switch 23 turns off, the current-voltage transformer 112 generates an input sensing voltage VIS in accordance with the input voltage Vin. By contrast, when the power switch 23 turns on, the current-voltage transformer 112 generates an input sensing voltage VIS of the ground voltage.

The zero voltage detector 120 generates a zero cross detection signal ZCD for predicting the point when the input voltage Vin is "0" by using the input sensing voltage VIS transmitted from the voltage sensor 110. The zero voltage detector 120 generates a zero cross detection signal ZCD by using the input sensing voltage VIS generated during the turned-off period of the power switch 23. Specifically, the zero voltage detector 120 compares the input sensing voltage VIS generated during the turned-off period of the power switch 23 with a predetermined reference value approximate to zero (0). When the input sensing voltage VIS is not less than the reference value, the zero voltage detector 120 generates a high-level signal as a zero cross detection signal ZCD. By contrast, when the input sensing voltage VIS is less than the reference value, the zero voltage detector 120 generates a low-level signal as a zero cross detection signal ZCD.

The reference clock generator 130 receives a predetermined clock signal CLK1 and a zero cross detection signal ZCD, and generates a reference clock signal RCLK for generating a reference signal SREF with a phase and frequency similar to those of the input voltage Vin. At this time, the reference signal SREF is formed with a full-wave rectified sine curve similar to the input voltage Vin. A predetermined clock signal CLK1 is input from the oscillator 130. The reference clock generator 130 estimates two zero cross time points when the input voltage Vin is "0," by using the zero cross detection signal ZCD. The period between the estimated two successive zero cross time points corresponds to one cycle of the input voltage Vin. The reference clock generator 130 generates a reference clock signal RCLK which rises or falls a predetermined reference number of times during the period of one cycle. The reference number of times is fixed to a predetermined value. Accordingly, when one cycle of the input voltage Vin varies, the frequency of the reference clock signal RCLK is altered. The reference number of times is the number of times in which the value of the reference signal SREF required for generating the reference signal SREF similar to the full-wave rectified sine curve increases and decreases. With an exemplary embodiment of the present invention, in order to generate the reference signal SREF similar to the full-wave rectified sine curve, the reference signal SREF should be gradually increased during a predetermined period of time, and again gradually decreased during another predetermined time period. At this time, the increasing or decreasing number of times may be fixed to a predetermined value, and the sum thereof is called the reference number of times. The reference clock generator 130 generates a reference clock signal RCLK which has edges (including a rising edge and a falling edge) the reference number of times during one cycle of the input voltage Vin after the second of the two successive zero cross time points. The reference clock generator 130 estimates a third zero cross time point when the input voltage Vin reaches "0" after the second zero cross time point. The reference clock generator 130 detects the third zero cross time point from the second time point as a new cycle of the input voltage Vin. Then, the reference clock generator 130 generates a reference clock signal RCLK having edges by the reference number of times during one cycle of the input voltage Vin after the third zero cross time point. The zero cross time point is detected by using the zero cross detection signal ZCD, and a description thereof will be given later.

With the repetition of the above operations, a reference clock signal RCLK is generated, in which the frequency is altered in accordance with the input voltage.

The digital sine curve generator 140 receives the zero cross detection signal ZCD and the reference clock signal RCLK, and generates digital information for generating the full-wave rectified sine curve synchronized with the input voltage Vin by using the two signals. The digital information according to an exemplary embodiment of the present invention involves a form where n bits of digital values are successively arranged, and includes n bits of digital values, which are the same as the reference number of times during one cycle of the input voltage Vin. The digital sine curve generator 140 senses the zero cross time point by using the zero cross detection signal ZCD, and transmits n bits of digital values to the digital-to-analog converter 150 (referred to hereinafter as the "DAC") in synchronization with the rising and falling edges of the reference clock signal RCLK after the zero cross time point.

The digital value increases during half of one cycle of the estimated input voltage Vin, and decreases during the other half. This is controlled depending upon the reference number of times. For example, in case the number of times is 26, the digital value increases from the first rising (or falling) edge time of the reference clock signal RCLK to the thirteenth rising (or falling) edge time thereof after the zero cross point. The increased amount of digital values is established to be appropriate for generating the full-wave rectified sine curve. The digital value decreases from the fourteenth falling (or rising) edge time of the reference clock signal RCLK to the twenty sixth falling (or rising) edge time thereof. The decreased amount of digital values is established to be appropriate for generating the full-wave rectified sine curve.

It is described up to now that the digital value is transmitted to the DAC 150 at the rising and falling edges of the reference clock signal RCLK, but the present invention is not limited thereto. The digital value may be transmitted to the DAC 150 only at the rising edge time of the reference clock signal RCLK or only at the falling edge time thereof, and in this case, the reference clock signal RCLK involves a frequency of two times more than that when the digital value is transmitted to the DAC 150 at the rising and falling edge times of the reference clock signal RCLK.

The DAC 150 converts the input digital value into an analog voltage signal in real time, and outputs it. The voltage signal output from the DAC 150 becomes the reference signal SREF. The reference signal SREF is similar in form to the full-wave rectified sine curve.

The operation of a switch controller according to an exemplary embodiment of the present invention will now be described with reference to FIG. 3.

Figure 3:
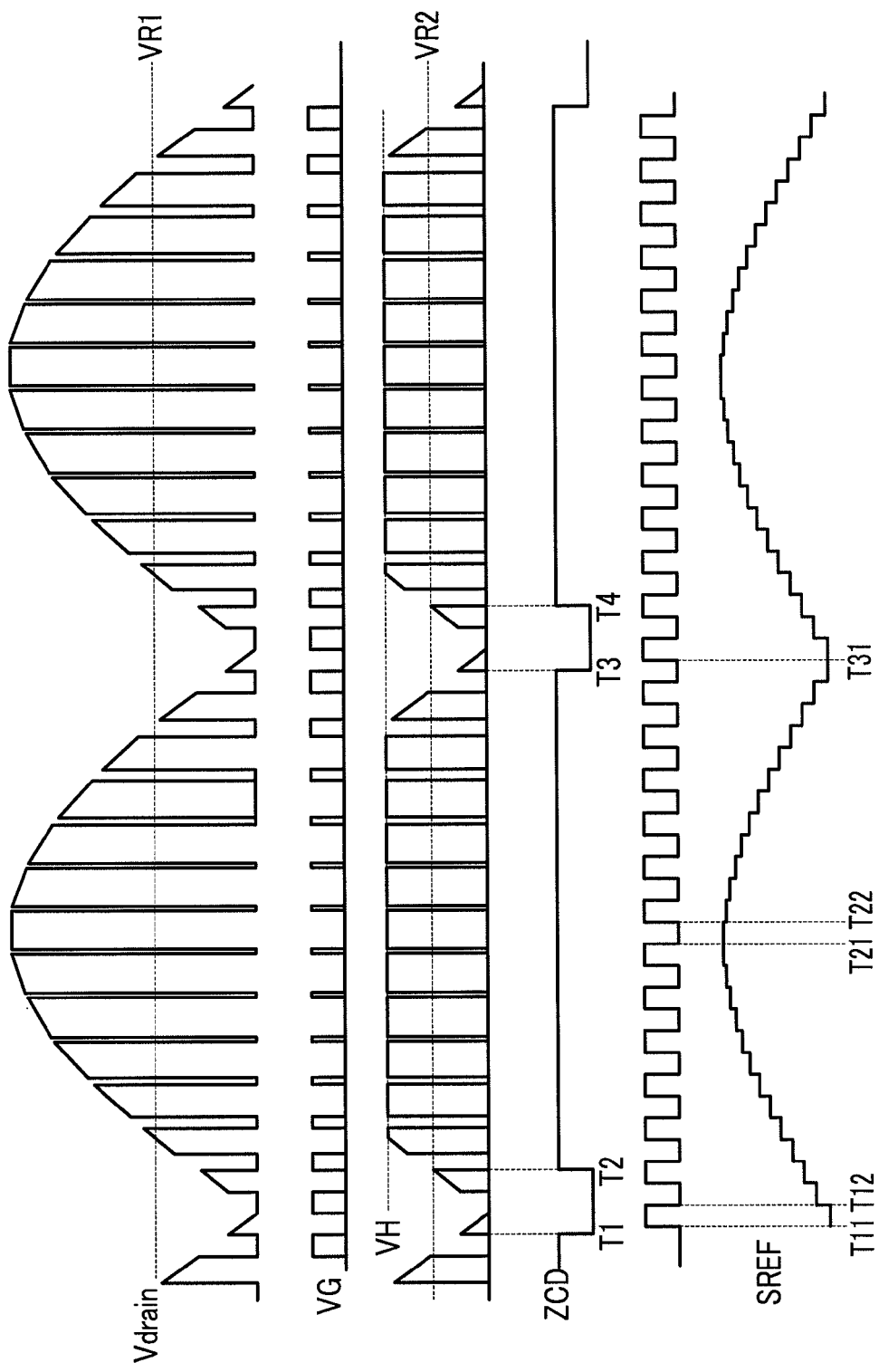
FIG. 3 illustrates input and output signals of a switch controller according to an exemplary embodiment of the present invention.

FIG. 3 illustrates input and output signals of a switch controller according to an exemplary embodiment of the present invention.

As shown in FIG. 3, the drain voltage Vdrain is substantially the same as the ground voltage when the power switch 23 turns on. The drain voltage Vdrain is substantially the same as the input voltage Vin when the power switch 23 turns off. The current flowing along the inductor L1 can be expressed by Equation 1.

$$IL = (Vin - VL) * t/L \qquad \text{(Equation 1)}$$

In Equation 1, "VL" indicates the voltage applied to the load, "t" indicates the period of current flowing, and "L" indicates the inductance of the inductor L1. In case the input voltage Vin is high, the inductor current IL increases SO that the duty may be reduced. For this reason, the duty of the gate signal VG shown in FIG. 3 is reduced as the input voltage Vin rises.

When the drain voltage Vdrain is not less than a predetermined threshold value VR1, the operation region of a transistor element of the sensing current generator 111 becomes a saturated region. Then, a high current flows along the transistor element, irrespective of the drain voltage Vdrain. Accordingly, in case the power switch 23 turns off during the period when the drain voltage Vdrain is not less than the threshold value VR1, the input sensing voltage VIS becomes a VH voltage. When the drain voltage Vdrain is less than the threshold value VR1, an input sensing voltage VIS proportional to the drain voltage Vdrain is generated.

In case the input sensing voltage VIS is less than the reference value VR2 at a time point T1, the zero cross detection signal ZCD is in the low level. As the input sensing voltage VIS is the reference value VR2 during the period of T1 to T2, the zero cross detection signal ZCD is maintained in the low level.

In case the input sensing voltage VIS is not less than the reference value VR2 at a time point T2, the zero cross detection signal ZCD is in the high level. As the input sensing voltage VIS is not less than the reference value VR2 when the power switch 23 turns off during the period of T2 to T3, the zero cross detection signal ZCD is maintained in the high level.

As the input sensing voltage VIS is less than the reference value VR2 at a time point T3, the zero cross detection signal ZCD is in the low level. As the input sensing voltage VIS is not less than the reference value VR2 at a time point T4, the zero cross detection signal ZCD is in the high level. As the input sensing voltage VIS is less than the reference value VR2 during the period of T3 to T4, the zero cross detection signal ZCD is maintained in the low level.

The reference clock generator 130 estimates the first time point T1 being the failing edge timing of the zero cross detection signal ZCD and the third time point T3 being the next falling edge timing thereof as the two successive zero cross time points.

However, the present invention is not limited thereto. Specifically, an arbitrary time point between the first and second time points T1 and T2 may be estimated to be the zero cross time point.

As the period of T1 to T2 is practically very short, either an arbitrary time point during the period of T1 to T2 or any one of the time points T1 and T2 may be estimated to be the zero cross time point.

The reference clock generator 130 estimates the period of T1 to T3 as the period corresponding to one cycle of the input voltage Vin, and determines the frequency of the reference clock signal RCLK.

Specifically, the reference clock generator 130 determines the frequency of the reference clock signal RCLK through dividing the estimated one cycle by the reference number of times. When the frequency of the reference clock signal RCLK is determined, the reference clock generator 130 generates a reference clock signal RCLK with the frequency determined based on the period of T1 to T3 after the time point T3. The reference clock signal RCLK during the period of T1 to T3 is determined based on an estimated one cycle before the time point T1.

For explanatory convenience, n bits of digital values will be hereinafter established to be four bits of digital values, and the reference number of times to be 26.

The digital sine curve generator 140 senses a zero cross detection signal ZCD, and recognizes the point T1 when the zero voltage sensing signal ZCD falls. The digital sine curve generator 140 recognizes the time point T1 as the zero cross time point when one cycle of the input signal Vin newly begins. At the first rising edge timing T11 after the time point T1, the digital sine curve generator 140 transmits the digital value "0000" to the DAC 150. Then, the DAC 150 outputs the lowest-level voltage corresponding to the value "0000."

At the failing edge timing T12, the digital sine curve generator 140 transmits the digital value "0001" to the DAC 150. Then, the DAC 150 outputs a voltage leveled corresponding to the value "0001."

When the digital value increases up to "0010," "0011," "0100," "0101," "0110," "0111," "1000," "1001," "1010," "1011," and "1100," the DAC 150 sequentially increases the level of the voltage signal while being differentiated in growth depending upon the digital values. The growth of the voltage level is established such that the reference signal SREF is generated to be similar in shape to the full-wave rectified sine curve. The reference number of times is established to be 26, and when the digital value grows from "0000" to "1100," the reference signal SREF increases by the number of times corresponding to half of the reference number of times. The digital sine curve generator 140 generates a digital value "1100" corresponding to a half of the reference number of times, and again generates "1100" at the rising or falling edge timing of the generated reference clock signal. Then, the digital sine curve generator 140 sequentially decreases the digital values from the rising and falling edge time points of the reference clock signal RCLK. With an exemplary embodiment of the present invention, in order to generate a reference signal SREF similar to the full-wave rectified sine curve, the highest digital value "1100" is maintained constant during one cycle of the reference clock signal SCLK. However, the present invention is not limited thereto. As the reference number of times is established to be higher, the generated reference signal SREF becomes further similar to the full-wave rectified sine curve.

The digital sine curve generator 140 generates a digital value "1100" at a time point T21, and transmits it to the DAC 150. The DAC 150 outputs the voltage leveled corresponding to the value "1100."

The digital sine curve generator 140 generates a digital value "1011" at a time point T22, and transmits it to the DAC 150. The DAC 150 outputs the voltage leveled corresponding to the value "1011."

In this way, the digital sine curve generator 140 sequentially transmits the digital values, which are reduced to "0000," to the DAC 150, and the DAC 150 generates a voltage signal level corresponding to the digital value.

After the time point T3, the zero voltage detector 120 estimates the period of T1 to T3 as one cycle of the input voltage Vin. From the time point T3, the reference clock generator 130 generates a reference clock signal RCLK which rises and falls the reference number of times during the period of T1 to T3. The digital sine curve generator 140 generates a digital value "0000" at the rising edge timing T31 of the reference clock signal RCLK, and the DAC 150 outputs the lowest-level voltage signal corresponding to the digital value "0000."

The subsequent operations are the same as those described above. With an exemplary embodiment of the present invention, the minimum digital value "0000" and the maximum digital value "1100" are repeated two times. This is determined only for generating a reference signal SREF similar to the full-wave rectified sine curve, but the present invention is not limited thereto.

The variation in the frequency and the phase of the input voltage Vin is not made radically within a short period of time. Accordingly, the frequency difference between the reference clock signal RCLK corresponding to one cycle of the input voltage Vin before the time point T1 and the reference clock signal RCLK during the period of T1 to T3 is so small so as to be ignored. Therefore, even though the frequency and the phase of the reference signal SREF are determined depending upon the frequency and the phase of the one cycle-before input voltage Vin, the frequency and the phase of the reference signal SREF are substantially similar to those of the current input voltage VREF.

In this way, with an exemplary embodiment of the present invention, the duty of the power switch 23 is determined by using the reference signal with a frequency and a phase similar to those of the input voltage Vin. The duty control signal DCS is in the high level when the sensing signal reaches the reference signal SREF, and is input into the reset terminal R of the SR flip-flop 13. Then, the gate signal VG is in the low level, and the power switch 23 turns off. When a high-level clock signal CLK is input into the set terminal S of the SR flip-flop 13, the gate signal VG is in the high level, and the power switch 23 turns on.

With an exemplary embodiment of the present invention, the zero cross detection signal ZCD may not be generated normally. Specifically, the point when the input voltage Vin becomes less than the threshold value VR1 is not sensed so that the zero cross detection signal ZCD may be maintained in the high level while not being reduced to the low level. In this case, the estimation of the frequency and the phase of the input voltage Vin in accordance with the zero cross detection signal ZCD cannot be made. Then, a period of the zero cross detection signal ZCD cannot be determined.

With a switch controller according to another exemplary embodiment of the present invention, in case the zero cross detection signal ZCD is not specified in cycles, it generates a reference signal which is increased during a predetermined period of time and constantly maintained with a predetermined value.

The operation of a switch controller according to another exemplary embodiment of the present invention will now be described with reference to FIG. 4.

Figure 4:
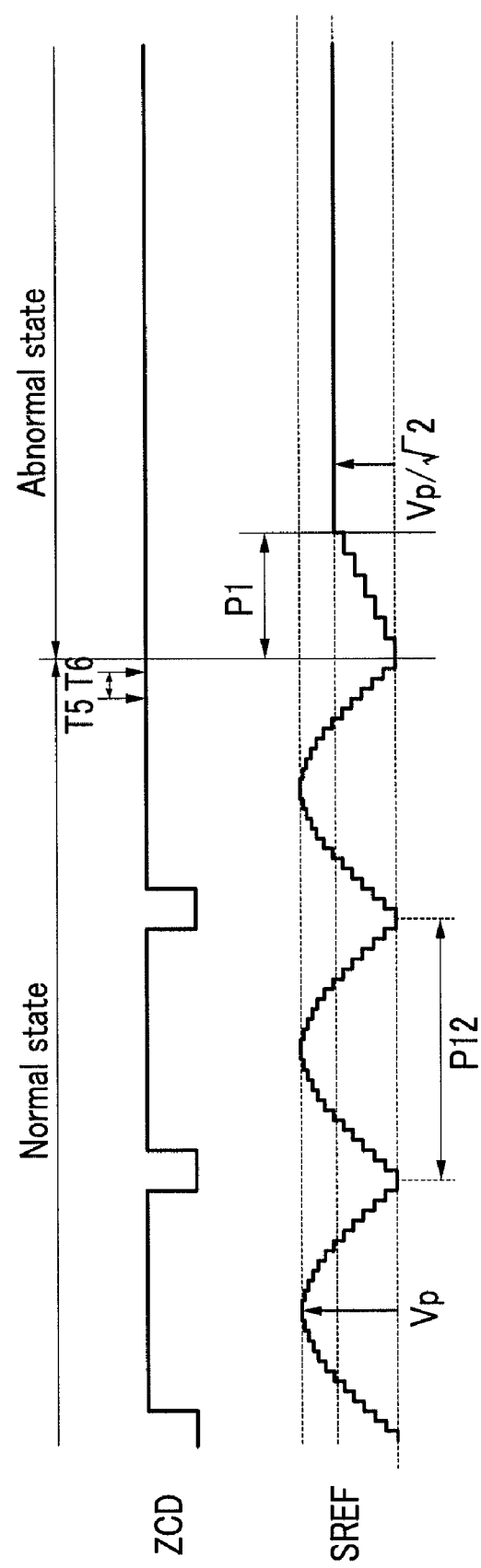
FIG. 4 illustrates a zero cross detection signal and a reference signal according to another exemplary embodiment of the present invention.

FIG. 4 illustrates a zero cross detection signal ZCD and a reference signal SREF according to another exemplary embodiment of the present invention.

The reference clock generator 130 judges the zero cross detection signal ZCD to be abnormal in case the falling edge timing of the zero cross detection signal ZCD is not sensed during a predetermined time period of T5 to T6 after a predetermined time point T5. At this time, the zero cross detection signal ZCD is maintained in the high level during a predetermined time period or more, and a predetermined time point and a predetermined time period are established so as to judge the case where a zero cross time point cannot be detected. When the reference clock generator 130 judges the zero cross detection signal ZCD to be abnormal, the reference clock generator 130 transmits the reference clock signal RCLK corresponding to the just-previous one cycle of the current input voltage Vin to the digital sine curve generator 140 again, and informs that the zero cross detection signal ZCD is abnormal. Specifically, the reference clock generator 130 outputs a separate control signal (not shown) to the digital sine curve generator 140. In case the control signal is in the low level, the zero cross detection signal ZCD is in the normal state. By contrast, in case the control signal is in the high level, the zero cross detection signal ZCD is in the abnormal state. However, the above is only illustrative, and the present invention is not limited thereto.

The digital sine curve generator 140 generates a reference signal SREF which, in case the zero cross detection signal ZCD is in the abnormal state, increases in accordance with the reference clock signal RCLK during a predetermined time period P1, and is constantly maintained with an effective threshold value. At this time, the predetermined time period P1 is determined such that the reference signal SREF rises slowly so as to prevent the duty from varying abruptly. The effective threshold value is established to be $1/\sqrt{2}$ of the maximum value Vp of the reference signal SREF in the normal state. The reference signal SREF in the abnormal state is established to bear the root-mean-square of the peak value of the reference signal SREF in the normal state such that the whole duty is maintained the same compared to that in the normal state.

As shown in FIG. 4, in case the zero cross detection signal ZCD is maintained in the high level during the period of T5 to T6 after the time point T5, the reference clock generator 130 judges that the zero cross detection signal ZCD is abnormal. The time points T5 and T6 can be set according to the reference signal SREF or the reference clock signal RCLK. The time point T5 is the time when the reference signal SREF or the reference clock signal RCLK is reduced to a predetermined value PV1 (not shown in FIGs), and the time point T6 is the time when the reference signal SREF or the reference clock signal RCLK is reduced to a predetermined value less than the predetermined value PV1. The reference clock generator 130 transmits a control signal to the digital sine curve generator 140 so as to inform that the zero cross detection signal ZCD is abnormal, and transmits the reference clock signal RCLK transmitted to the digital sine curve generator during the period P12 to the digital sine curve generator 140.

The digital sine curve generator 140 sequentially increases the digital values in accordance with the reference clock signal RCLK during the period P1. When the reference signal SREF reaches $1/\sqrt{2}*Vp$, the digital sine curve generator 140 outputs a digital value holding the level of the reference signal SREF.

As described above, with a switch controller according to another exemplary embodiment of the present invention, in case the zero cross detection signal ZCD is in the abnormal state, the effective value of the reference signal in the normal state is used as a reference signal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A switch controller comprising:
a voltage sensor configured to generate an input sensing voltage corresponding to a voltage input into the switch;
a zero voltage detector configured to:
compare the input sensing voltage with a predetermined first reference value; and
generate a zero cross detection signal with a first level or a second level in accordance with a result of the comparison;
a reference clock generator configured to generate a reference clock signal such that the reference clock signal varies in frequency by one cycle of the zero cross detection signal;
a digital sine curve generator configured to generate digital signals by using the reference clock signal and the zero cross detection signal, the digital signals synchronizing with the zero cross detection signal while increasing in accordance with the reference clock signal during half of the one cycle of the zero cross detection signal and decreasing in accordance with the reference clock signal during the other half cycle of the zero cross detection signal; and
a digital-to-analog converter configured to generate a reference signal with a voltage level corresponding to the digital signal.

2. The switch controller of claim 1, wherein the voltage sensor comprises:
a sensing current generator configured to generate a current corresponding to an electrode voltage of a first electrode, and
a current-voltage transformer configured to generate a voltage corresponding to a current.

3. The switch controller of claim 1, wherein the zero voltage detector is configured to generate:
the zero cross detection signal with the first level when the input sensing voltage exceeds the first reference value, and
the zero cross detection signal with the second level when the input sensing voltage is less than the first reference value.

4. The switch controller of claim 3, wherein the reference clock generator is further configured to:
sense a reference point when the zero cross detection signal varies from the first level to the second level so as to produce the one cycle of the zero cross detection signal by using two successive reference time points, and
generate the reference clock signal rising and falling a predetermined number of times during the one cycle.

5. The switch controller of claim 3, wherein:
the switch controller is configured to sense an arbitrary time point as a reference time point during a time period ranging from a first point when the zero cross detection signal varies from the first level to the second level to a second point when the zero cross detection signal varies from the second level to the first level so as to produce the one cycle of the zero cross detection signal by using the first point and the second point, and the reference clock signal that rises and falls a predetermined number of times during the one cycle.

6. The switch controller of claim 1, wherein in case the zero cross detection signal is in an abnormal state where the zero cross detection signal is not specified in the one cycle, an effective value of a maximum reference signal value in a normal state of the zero cross detection signal is determined as the reference signal.

7. A converter comprising:
an inductor;
a power switch configured to control current flowing along the inductor; and
a switch controller configured to control a switching operation of the power switch, wherein the switch controller is configured to:
generate a reference signal corresponding to an input voltage supplied into the inductor, and
control a duty of the power switch by using the current flowing along the power switch and the reference signal.

8. The converter of claim 7, wherein the input voltage is supplied to a first end of the inductor and the power switch is electrically connected to a second end of the inductor, further comprising a diode connected between the second end of the inductor and the power switch, wherein the current flows along a first route comprising the inductor and the power switch when the power switch turns on, while the current flows along a second route comprising the inductor and the diode when the power switch turns off.

9. The converter of claim 7, wherein the switch controller comprises:
a voltage sensor configured to generate an input sensing voltage corresponding to a switch voltage when the switch turns off and the switch voltage corresponding to the input voltage supplied to an end of the power switch;
a zero voltage detector configured to:
compare the input sensing voltage with a predetermined first reference value; and
generate a zero cross detection signal with a first level or a second level depending upon a result of the comparison;
a reference clock generator configured to generate a reference clock signal varying in frequency by one cycle of the zero cross detection signal;
a digital sine curve generator configured to generate digital signals by using the reference clock signal and the zero cross detection signal, the digital signals synchronizing with the zero cross detection signal while increasing in accordance with the reference clock signal during a half of the one cycle of the zero cross detection signal and decreasing in accordance with the reference clock signal during the other half cycle of the zero cross detection signal; and
a digital-to-analog transformer configured to generate the reference signal with a voltage level corresponding to the digital signal.

10. The converter of claim 9, wherein the zero voltage detector is configured to generate:
the zero cross detection signal with the first level when the input sensing voltage exceeds the first reference value during the turned-off period of the switch, and
the zero cross detection signal with the second level when the input sensing voltage is less than the first reference value.

11. The converter of claim 10, wherein the reference clock generator is further configured to:
sense a reference point when the zero cross detection signal varies from the first level to the second level so as to produce the one cycle of the zero cross detection signal by using two successive reference time points, and
generate the reference clock signal rising and falling a predetermined number of times during the one cycle.

12. The converter of claim 10, wherein the reference clock generator is configured to:
sense an arbitrary time point as a reference time point during a time period ranging from a first point when the zero cross detection signal varies from the first level to the second level to a second time point when the zero cross detection signal varies from the second level to the first level so as to produce the one cycle of the zero cross detection signal by using the first point and the second point, and
generate the reference clock signal that rises and falls a predetermined number of times during the one cycle.

13. The converter of claim 9, wherein in case the zero cross detection signal is in the abnormal state where the zero cross detection signal is not specified in the cycle, an effective value of a maximum reference signal value in a normal state of the zero cross detection signal is determined as the reference signal.

14. The converter of claim 7 further comprising an oscillator generating a clock signal with a predetermined cycle, wherein the power switch turns off when the current flowing along the power switch reaches the reference signal, and turns on by one cycle of the clock signal.

15. A method of controlling the switching operation of a switch, the method comprising:
generating an input sensing voltage corresponding to the voltage input into the switch;
comparing the input sensing voltage with a predetermined first reference value;
generating a zero cross detection signal with a first level or a second level depending upon a result of the comparing;
generating a reference clock signal varying in frequency by one cycle of the zero cross detection signal;
generating digital signals by using the reference clock signal and the zero cross detection signal, the digital signals synchronizing with the zero cross detection signal while increasing in accordance with the reference clock signal during half of the one cycle of the zero cross detection signal and decreasing in accordance with the reference clock signal during the other half cycle of the zero cross detection signal; and
generating a reference signal with a voltage level corresponding to the digital signal.

16. The method of claim 15 further comprising turning off the switch when current flowing along the switch reaches the reference signal.

17. The method of claim 15, wherein generating the zero cross detection signal comprises:
generating the zero cross detection signal with the first level when the input sensing voltage exceeds the first reference value, or
generating the zero cross detection signal with the second level when the input sensing voltage is less than the first reference value.

18. The method of claim 17, wherein generating the reference clock signal comprises:

sensing the reference point when the zero cross detection signal varies from the first level to the second level so as to produce one cycle of the zero cross detection signal by using the two successive reference time points, and generating the reference clock signal such that the reference clock signal rises and falls a predetermined reference number of times during the one cycle.

19. The method of claim 17, wherein generating the reference clock signal comprises:

sensing an arbitrary time point as the reference time point during a time period ranging from a first point when the zero cross detection signal varied from the first level to the second level to a second point when the zero cross detection signal varies from the second level to the first level so as to produce the one cycle of the zero cross detection signal by using the first point and the second point, and generating the reference clock signal such that the reference clock signal rises and falls a predetermined reference number of times during the one cycle.

20. The method of claim 15 further comprising determining an effective value of a maximum reference signal value in a normal voltage of the reference signal as the reference signal in case the zero cross detection signal is in an abnormal state where the cycle thereof is not specified.

* * * * *